United States Patent [19]
Hanni et al.

[11] Patent Number: 5,512,074
[45] Date of Patent: Apr. 30, 1996

[54] AIR FILTER ASSEMBLY

[75] Inventors: Robert S. Hanni, Lomita; Robert R. Raber, Los Alamitos; Henry H. S. Yu, Rancho Palos Verdes, all of Calif.

[73] Assignee: Farr Company, El Segundo, Calif.

[21] Appl. No.: 308,695

[22] Filed: Sep. 19, 1994

[51] Int. Cl.$^6$ ..................................................... B01D 46/12
[52] U.S. Cl. ............................... 55/484; 55/493; 55/495; 55/497; 55/502; 55/506; 55/DIG. 31
[58] Field of Search ................................ 55/484, 493, 495, 55/497, 501, 502, 506, 509, 511, DIG. 31

[56] References Cited

U.S. PATENT DOCUMENTS

| | | | |
|---|---|---|---|
| 2,013,038 | 9/1935 | Dollinger | 55/484 |
| 2,044,221 | 6/1936 | Myers et al. | 55/484 |
| 2,130,806 | 9/1938 | Link | 55/484 |
| 2,198,190 | 4/1940 | Vokes | 55/484 |
| 2,675,094 | 4/1954 | Young | 55/484 |
| 2,966,959 | 1/1961 | Neumann | 55/484 |
| 3,047,994 | 8/1962 | Le Brun | 55/493 |
| 3,093,401 | 6/1963 | Hagendoorn | 55/493 |
| 3,487,625 | 1/1970 | Lucas | 55/484 |
| 3,576,095 | 4/1971 | Rivers | 55/484 |
| 4,865,636 | 9/1989 | Raber | 55/484 |
| 5,080,699 | 1/1992 | Ho | 55/179 |
| 5,223,011 | 6/1993 | Hanni | 55/484 |

FOREIGN PATENT DOCUMENTS

747501  7/1980  U.S.S.R. .................................. 55/484

*Primary Examiner*—Jay H. Woo
*Assistant Examiner*—Duane S. Smith
*Attorney, Agent, or Firm*—Lyon & Lyon

[57] ABSTRACT

A filter assembly of the Vee-panel type including a filter frame and a plurality of complementary pairs of replaceable and interchangeable filter panels slidably mounted within the frame and defining a plurality of adjacent Vees with the apexes of the Vees being disposed adjacent the air outlet end of the assembly. The filter frame defines a plurality of rectangular perimeter panel retention surfaces adjacent the sides of the filter panels for retaining the panels in place and forming an airtight perimeter seal therewith. A compressible gasket is disposed about each of the panel retention surfaces. The extended ends of each of the filter panels is provided with an end cap secured thereto. Each end cap defines a pair of identically configured cam surfaces thereon proximate the extended ends thereof. One of the cam surfaces on each of the end caps is disposed between each of the pairs of filter panels at the apex of the Vee defined thereby and abuts a cam surface on the end cap of the other panel in the pair, forcing the panes outwardly against adjacent panel retention surfaces and compressing the sealing gaskets therebetween. The other cam surface defined by each of the end caps is disposed adjacent the inlet end of the assembly and is releasably engaged by a locking clip carried by the frame at the inlet end of the assembly to form and maintain perimeter compression seals about and between each of the panels and the adjacent panel retention surfaces.

30 Claims, 3 Drawing Sheets fig. 2

AIR FILTER ASSEMBLY

BACKGROUND OF THE INVENTION

The present invention relates to air filter assemblies of the multiple Vee-panel type and, more particularly, to an improvement in the mounting of the filter panels therein. In such filter assemblies a plurality of pairs of relatively flat filter panels are angularly mounted in a support frame so as to define a corresponding plurality of adjacent Vees. The apexes of the formed Vees are disposed adjacent the air outlet end of the filter assembly and the open ends of the Vees define air inlets. Typically, a plurality of such filter assemblies are replaceably mounted in adjacent juxtaposition in a large master holding frame secured to a large air duct. In recent years the multi-Vee panel type air filter has become widely used in numerous different applications due to the ability of the Vee-panel configuration to accommodate efficiently large volumes of different types of filter media with a minimum pressure drop across the filter assembly.

Until recently the individual filter panels in a multi-Vee panel filter assembly were generally permanently mounted in the support frame due to the difficulty of obtaining an airtight seal between replaceable panels and the support frame at the rear end of the assembly. As a result, when the individual filter panels needed replacement, it was necessary to remove and replace the entire filter assembly. This was not only costly but created both handling and disposal problems due to the bulk of the support frame and the fact that installations generally employed several such filter assemblies bolted together in the master holding frame. With the diminishing availability of landfill disposal sites, the problem of filter disposal was becoming increasingly acute.

A solution to these problems is found in applicant's U.S. Pat. No. 5,223,011. The multiple Vee-panel air filter assemblies disclosed therein employ a novel camming mechanism for each complementary pair of angularly disposed panels which maintains the necessary seals between the individual filter panels and the assembly frame at the rear ends thereof and enables the panels to be slidably mounted and readily replaceable within the frame. Compressible sealing gaskets are disposed about open side portions of the frame to provide airtight perimeter compression seals between the frame and the outer sides of the filter panels. At least one of the panels in each of the complementary pairs of panels define an elongated cam surface extending vertically along a rear side portion thereof adjacent the inner rear edge of the panel. The cam surface is inclined rearwardly and inwardly within the frame upon the cam carrying panel being slid into position within the frame. As the complementary panel is slid into the frame so as to form a Vee with the first panel, the inner rear edge of the complementary panel abuts and slides over the cam surface on the first panel, forcing the two panels apart at the rear ends thereof such that they compress the adjacent portions of the sealing gaskets carried by the frame.

To complete and maintain the desired airtight compression seals between the support frame and the entire outer perimeters of the outer sides of the filter panels, a pair of locking clips are provided on each panel at or adjacent the forward ends thereof. The locking clips are adapted to releasibly engage portions of the support frame upon the forward end portion of a filter panel being pressed outwardly against the frame, whereupon the sealing gasket is continuously compressed against the frame about the panel. Thus, to replace the filter panels in the filter assembly disclosed in U.S. Pat. No. 5,223,011, it is only necessary to disengage the locking clips from the frames, withdraw the old panels, slide in the new panels and repeat the aforesaid camming and locking steps.

While the above-described filter assembly represented a substantial improvement in multiple Vee type filter assemblies, it had certain shortcomings. To mount the filter assembly on a master mounting frame it was still necessary to bolt the individual filter assemblies together and to the master holding frame. This was generally accomplished by providing each individual filter assembly with a square or rectangular mounting frame, depending on the shape of the filter assembly, which would be welded onto the filter assembly frame about the forward or air inlet end thereof and project forwardly therefrom. The mounting frame thus provides an attachment surface for the securement of the filter assembly to the mounting frame of an adjacent filter assembly and to the master holding frame. It also provided a support frame for the mounting of a pre-filter at the inlet end of the filter assembly. Thus, while these filter assemblies were removably secured to the master holding frame by means of the mounting frames, removal and securement both required a time intensive operation, quite unlike the removal and securement of the individual filter panels within the filter assembly.

While the camming and locking mechanisms in the above-described patented filter assembly do provide releasable perimeter seals about individually removable filter panels, they limit the flexibility of the filter assembly. To maintain airtight perimeter seals about the filter panels, the sealing gasket about each panel should be compressed by about 50% between the panel and the assembly frame. This was achieved in the filter assemblies disclosed in U.S. Pat. No. 5,223,011 by sizing the rear portion of the assembly frame relative to the widths of the filters panels to be held therein. The panel retention flanges on the assembly frame which carry the sealing gaskets adjacent the outer rearward ends of each pair of complementary filter panels were spaced apart a distance equal to the combined thicknesses of the complementary filter panels plus the offset of the cam surface or surfaces thereon and the thickness of an uncompressed sealing gaskets. As a result, a given filter frame could only be used with filter panels of a given transverse dimension. While this dimension could be varied somewhat by varying the offset of the elongated cam surfaces and/or the thickness of the sealing gaskets, the extent of the variance is quite limited by the configuration of the camming mechanism. This is significant because the transverse dimension of the filter panels in the patented assembly determined the depth of the filter media contained therein and the depth of the filter media through which the air flow passes directly affects pertinent air filter characteristics, e.g., dust holding capacity, efficiency and pressure loss. etc.. Thus, if a particular application required more than a very minor change in the depth of filter media to provide the desired air filter characteristics, a differently sized frame was required.

Different filter applications and economic considerations frequently dictate changes in the filter media used in these filter assemblies. Different filter medias frequently have different depth requirements to obtain the desired air filter characteristics. Accordingly, the above-described filter assemblies are also relatively limited with regard to the use of different medias. While they can indeed be used with a wide variety of filtering medias, variations in filter media will often require different panel thicknesses and thus the use of differently sized frames.

The filter assembly of the present invention retains all of the advantages of the assemblies disclosed in U.S. Pat. No.

5,233,011 and obviates the mounting and versatility of problems noted above. With the present invention, the same filter frame can be used with filter panels employing a wide variety of different medias and wherein the depth of the media can vary significantly. The individual filter panels are interchangeable throughout the entire filter assembly to facilitate panel replacement and avoid the need to use different panel configurations in each complementary pair of panels. The filter assembly of the present invention is also capable of being removably attached to a master holding frame without the need for any tools and can be easily detached therefrom. The present invention further provides an improved locking mechanism for holding the filter panels in sealing engagements with the frame and additionally utilizes a filter panel which is of a more economical construction than the removable panels heretofore in use.

DESCRIPTION OF THE PREFERRED EMBODIMENTS

Figure 1:
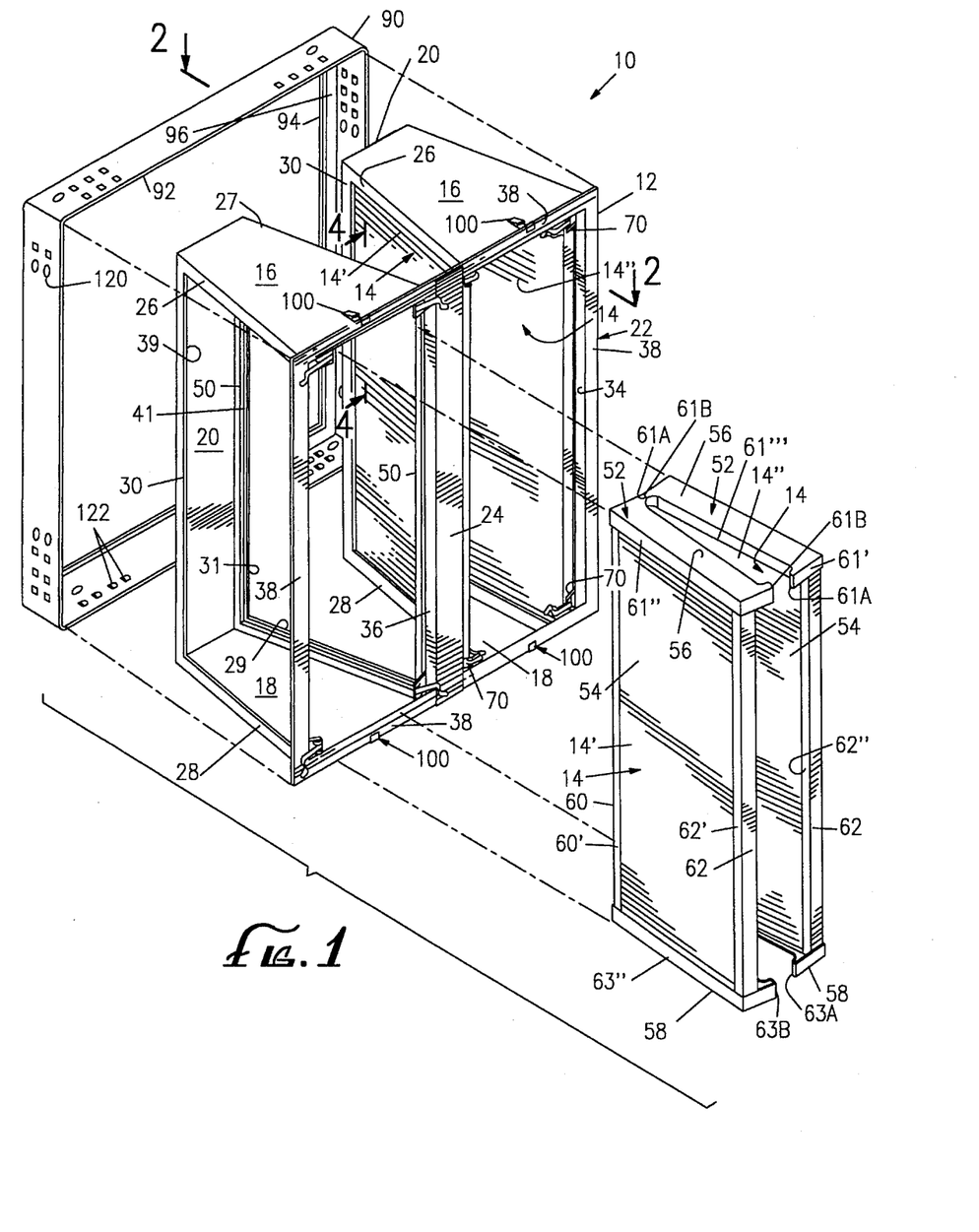
FIG. 1 is a perspective exploded view of a filter assembly of the present invention including the mounting frame therefor.

Referring now in detail to the drawings, the filter assembly 10 of the present invention comprises a support frame 12 and a plurality of filter panels 14. The filter panels 14 are disposed within the frame 12 so as to define a conventional multiple Vee configuration with each Vee being comprised of a complementary pair of filter panels 14' and 14". The number of pairs of such panels, the type and depth of filter media contained therein, and the size of the panels and frame can be varied for different applications and installations. A typical design might employ two pairs of complementary filter panels, each panel containing a pleated paper wet-laid HEPA style filtering media for particulate filtration or activated carbon or impregnated alumina media for gas phase air cleaning. These panels are up to about 2.5 inches in depth and define two adjacent Vees for a filter assembly 24 inches wide and 24 inches high. Such a configuration for particulate filtration is illustrated in FIG. 1 in the drawings wherein one complementary pair of panels 14' and 14" is shown secured within the right side of the assembly frame 12 and the second pair is shown removed therefrom. In a typical installation, a plurality of filter assemblies 10 would be removably mounted adjacent juxtaposition in a conventional master holding frame (not shown) secured to the inlet end of a large air duct such as those utilized in commercial heating, ventilating, and air-conditioning systems.

The support frame 12 of assembly 10 can be constructed of sheet metal or a suitable plastic material and is configured so as to define a plurality of pairs of vertically aligned tapered top walls 16 and tapered bottom walls 18, a corresponding plurality of elongated rear walls 20, a frame support 22 disposed at and extending about the forward ends of top and bottom walls 16 and 18, and a centrally disposed panel support member 24. In the four-panel configuration shown in the drawings, the support frame 12 defines two adjacent sets of top, bottom and rear walls 16, 18 and 20 with support member 24 being disposed therebetween. To accommodate additional filter panels for different applications, additional sets of top, bottom and rear walls could be added together with one or more support members 24 depending on the number of pairs of filter panels to be added and support frame 22 would be configured accordingly.

Figure 2:
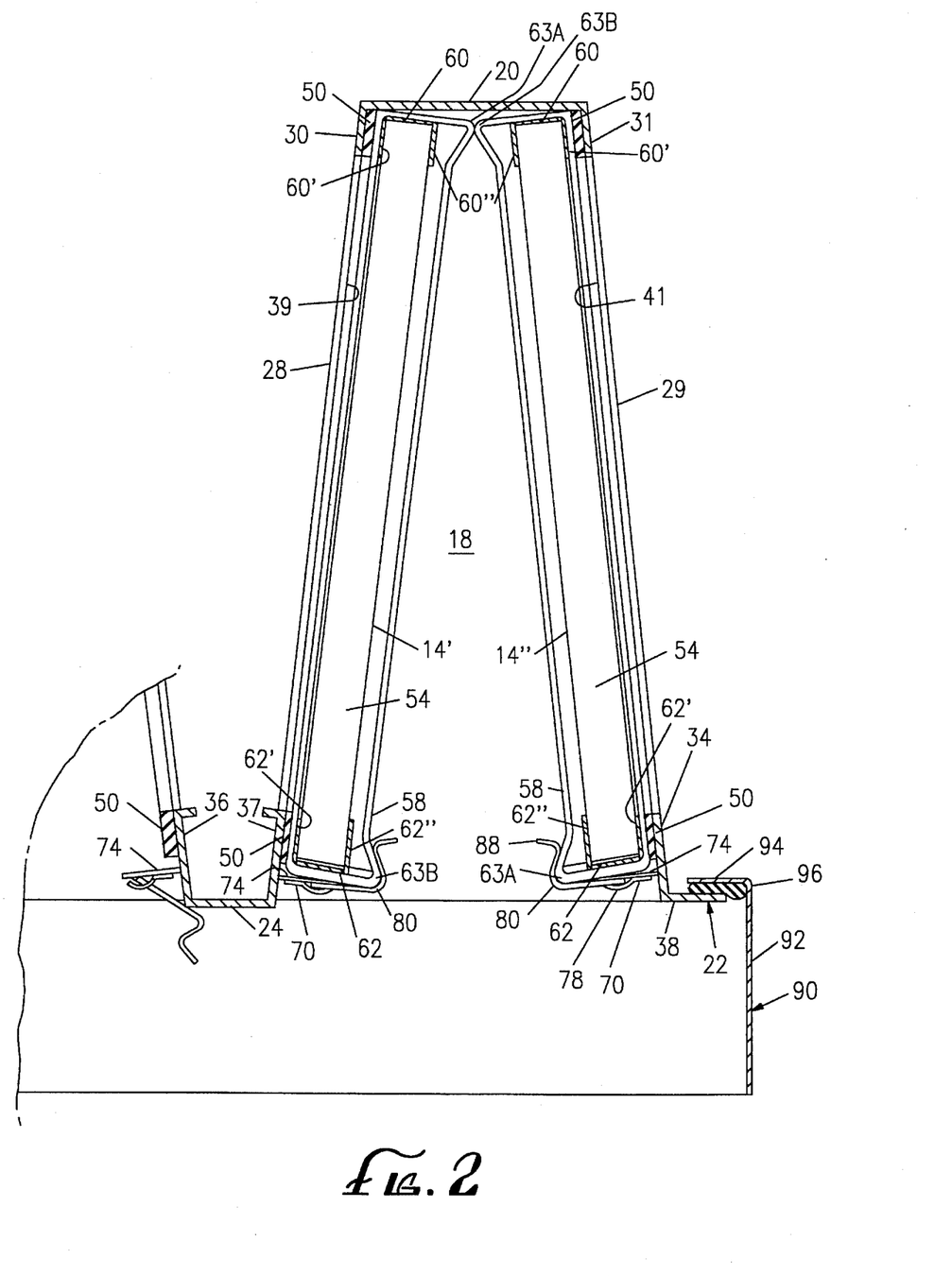
FIG. 2 is a sectional view taken along the line 2—2 in FIG. 1.

Each aligned pair of tapered top and bottom frame walls 16 and 18 and the vertical rear wall 20 extending therebetween are preferably of single piece construction and respectively define at their lateral ends, inwardly directed lateral panel retention flanges 26 and 27, 28 and 29 and 30 and 31, as seen in FIGS. 1 and 2. In each of the two adjacent sets of aligned top, bottom and rear walls, flanges 26, 28 and 30 are coplanar and flanges 27, 29 and 31 are coplanar. The planes defined thereby are oppositely inclined with respect to the aligned central axes of the top and bottom walls 16 and 18 from which the flanges extend.

The square frame support 22 is secured to and extends about the forward ends of top and bottom panel walls 16 and 18. Support 22 defines a pair of vertically disposed outer forward lateral panel retention flanges 34 (only one such flange being shown in FIG. 1) and a flat perimeter mounting flange 38 projecting outwardly from and about frame 12. The centrally disposed panel support member 24 defines a pair of inner forward lateral panel retention flanges 36 and 37 on opposite sides thereof (see FIGS. 1 and 2). Support member 24 is secured to and disposed between lateral panel retention flanges 26 and 27 and to mounting flange 38 at its upper end and flanges 28 and 29 and to flange 38 at its lower end so as to extend vertically between the adjacent top walls 16 and bottom walls 18 of frame 12. The panel support member 24 is preferably substantially U-shaped in cross section, however, the inner panel retention flanges 36 and 37 defined thereby are inclined outwardly and rearwardly with flange 36 being coplanar with panel retention flanges 27, 29 and 31 defined by the aligned set of top, bottom and rear walls disposed to the left side of member 24 and flange 37 being coplanar with the panel retention flanges 26, 28 and 30 defined by the set of aligned walls disposed to the right of member 24 as illustrated in FIGS. 1 and 2.

Through the aforesaid configuration, the adjacent and coplanar panel retention flanges of support frame 12 define two rectangular and oppositely inclined lateral panel retention surfaces 39 and 41 for each set of aligned top, bottom and rear frame walls. For the aligned set of top, bottom and rear panel walls shown in the drawings, the panel retention flanges 37, 26, 28 and 30 collectively define the left panel retention surface 39 for the right half of the filter assembly, and flanges 34, 27, 29 and 31 collectively define the right panel retention surface 41 therefor. For the other set of aligned walls (left half of the illustrated filter assembly), the left panel retention surface would be defined by coplanar flanges 34, 26, 28 and 30, and the right panel retention surface would be defined by coplanar flanges 36, 27, 29 and 31. As the filter assembly 10 is symmetrical about the central support member 24, only the right side thereof is shown in detail in FIG. 2.

As seen in FIGS. 1 and 2, complementary pairs of filter panels 14' and 14" are slidably disposed in adjacent Vee configurations between and adjacent each pair of aligned top and bottom walls 16 and 18. The outer side of filter panel 14' (left panel) in each such pair is adjacent lateral panel retention surface 39 and the outer side of filter panel 14" is adjacent retention surface 41. To provide the desired airtight seal between the filter panels and the panel retention surfaces 39 and 41, strips of adhesive-backed HVAC open cell gasket material are secured to and extend along each of the panel retention surfaces to define sealing gaskets 50 between each of the panel retention surfaces 39 and 41 on the support frame 12 and the outer side walls of the filter panels.

In the present invention, the filter panels 14' and 14" are of identical configuration and each comprises a relatively flat, rigid, air impervious, and generally rectangular frame 52 within which the filtering media 54 is retained. Frame 52 includes upper and lower end caps 56 and 58, a rear panel-wall 60 and a front panel wall 62. Panel walls 60 and 62 are preferably formed of a thin cardboard material and each define inwardly directed media retention flanges 60' and 62' at the outer lateral edges thereof and inwardly directed media retention flanges 60" and 62" at the inner lateral edges thereof. Panel walls 60 and 62 extend between and are secured to the panel end caps 56 and 58 so as to retain the filter media 54 therebetween.

End caps 56 and 58 are generally rectangular and of a rigid construction, preferably of identical configuration and molded of a plastic material. End caps 56 and 58 define respectively, a flat top panel wall 57 and a bottom panel wall 59 and a side wall 61 and 63 extending about the perimeter of and projecting normally from top and bottom walls 57 and 59 so as to define troughs 65 and 67 open at their inwardly facing ends. The side walls 61 and 63 of end caps 56 and 58 also define respectively, end wall portions 61' and 63', outer wall portions 61" and 63", inner wall portions 61'" and 63'", and a pair of cam surfaces 61A and 61B and 63A and 63B.

Figures 5, 6:
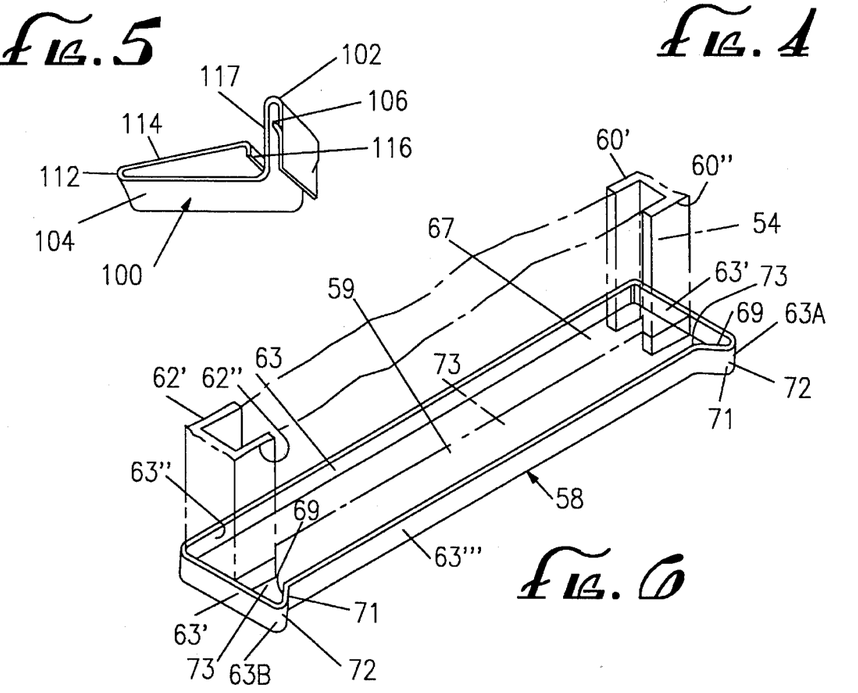
FIG. 5 is a perspective view of a frame securement clip employed in the present invention.
FIG. 6 is a perspective view of the lower end cap of a filter panel of the present invention with the filter panel frame and filter media being shown in phantom lines.

The cam surfaces 61A and 61B on end cap 56 are disposed adjacent and extend between the extended ends of ' inner wall portion 61'" and the end wall portions 61' of the cap. Cam surfaces 61A and 61B each define oppositely inclined surfaces 69 which merge at their extended ends 71 into convex curvilinear surfaces 72 which in turn merge into the end wall portions 61' of upper end cap 56. End cap 58, which is shown in FIG. 6, is preferably of identical configuration to end cap 56 and the cam surfaces 63A and 63B thereon defined by perimeter wall 63 also include oppositely inclined surfaces 69 which merge into curvilinear surfaces 72 between the extended ends of inner wall portion 63'" and end wall portions 63'.

The upper end portions of the rear filter panel wall 60, front wall panel 62 and filter media 54 are disposed within the trough 65 defined by end cap 56 adjacent the outer wall portion 61" thereof and proximate portions of end wall portions 61' and top panel wall 57. The end portions of the panel walls and media are secured in place by a self-foaming urethane adhesive potting compound or other suitable adhesive 73. The lower end portions of rear panel wall 60, front panel wall 62 and filter media 54 are similarly secured within trough 67 of lower end cap 58 adjacent the outer wall portion 63" thereof and proximate portions of end wall portions 63' and bottom panel wall 59. The formation of troughs 65 and 67 in end caps 56 and 58 facilitates construction of filter panels 14 by locating the panel walls relative to the end caps and by retaining the adhesive 73 in place as it hardens to effect the sealing engagement of the end caps to the filter panel walls and filter media. As will be discussed later herein, the configuration of the panel end caps 56 and 58 also spaces the cam surfaces defined thereby from the panel walls and inner media retention flanges 60" and 62" defined thereby so as to allow for variations in the width of the panel walls and thus in the transverse dimension (depth) of the filter media without affecting the cooperation of the cam surfaces with the assembly frame.

In order to obtain the desired seals between the filter panels and the support frame, it is necessary to maintain the sealing gaskets 50 disposed therebetween in continual compression. This is achieved by the cam surfaces defined by the end caps of the filter panels in cooperation with a plurality of locking clips 70 carried by the forward air inlet end of assembly frame 12. When a complementary pair of filter panels 14' and 14" are slid into place within frame 12, the cam surfaces on the upper and lower end caps of panel 14' which are disposed adjacent the air outlet end of the filter assembly abut the adjacent rearwardly disposed cam surfaces on end caps 56 and 58 of filter panel 14", forcing the rearward portions of the two panels outwardly apart and against adjacent portions of the lateral retention surfaces 39 and 41 of frame 12, compressing the sealing gaskets 50 therebetween. Upon engaging the locking clips 70 carried by the air inlet end of assembly frame about the cam surfaces disposed at the forward ends of the upper and lower end caps 56 and 58, the forward outer portions of the filter panels 14' and 14" are secured against lateral retention surfaces 39 and 41, completing the perimeter face seals about the filter panels.

Thus, the cam surfaces on the panel end caps of each filter panel cooperate both with the cam surfaces on the end caps of an adjacent complementary panel and with the locking clips on the assembly frame to form the perimeter face seals of the panels with the frame. By also configuring the filter panels 14' and 4", including the end caps 56 and 58 thereon, such that they are all identical and configuring the cam surfaces on each end cap such that they are oppositely inclined and symmetrical about a central axis extending transversely through the end cap, the individual panels 14' and 14" are completely interchangeable throughout the filter assembly 10 to facilitate panel installation. For illustration and explanation purposes, however, the filter panels in each complementary pair of panels are separately designated 14' and 14" with panel 14' being shown as the left panel in each such pair. As seen in FIG. 1, when a complementary pair of filter panels are disposed within the filter assembly frame 12 as above-described, the cam surfaces 61A and 63A on the upper and lower end caps 56 and 58 of filter panel 14' are disposed adjacent the air outlet end of the filter assembly and cam surfaces 61B and 63B are disposed adjacent the air inlet end thereof. For illustration and explanation purposes, filter panel 14" is shown as the reverse of panel 14' such that cam surfaces 61B and 63B are disposed adjacent the rear air outlet end of the assembly abutting cam surfaces 61A and 63A on panel 14'.

As the cam surfaces on each of the end caps are identically configured, it does not matter which panel in each complementary pair of panels is first positioned in the assembly frame 12 during installation. One of panels 14, e.g., panel 14', is pushed toward the rear of the frame 12 such that the rear panel wall 60 thereof and the adjacent rearwardly disposed end wall portions 61' and 63' of end caps 56 and 58 thereon are disposed adjacent a rear wall 20 of the frame and the outer media retention flanges 60' and 62' of the filter panel and outer wall portions 61" and 63" of panel end caps 56 and 58 are facing the lateral panel retention surface 39 of support frame 12. As panel 14" is then pushed rearwardly within the frame, the inclined lateral retention surface 41 of the frame directs panel 14" against panel 14' such that the rear inner edges of end caps 56 and 58 of panel 14", which are defined by the curvilinear portions 72 of cam surfaces 61B and 63B thereon, contacts the inclined portions 69 of cam surfaces 61A and 63A on panel 14' and rides rearwardly thereover. As panel 14" is pushed to the rear of frame 12 adjacent rear frame wall 20, the curvilinear projection portions 72 of the cam surfaces 61A and 63A on panel 14" ride over and bear against the adjacent projecting portions 72 of the cam surfaces on panel 14', forcing the rearward end portions of panels 14' and 14" apart and compressing the adjacent portions of the sealing gaskets 50 between the panels and the lateral panel retention surfaces 39 and 41 on frame 12. The forward portions of panels 14' and 14" are then secured in place by locking clips 70 to complete the sealing engagement of the panels to the frame.

Figures 3, 4:
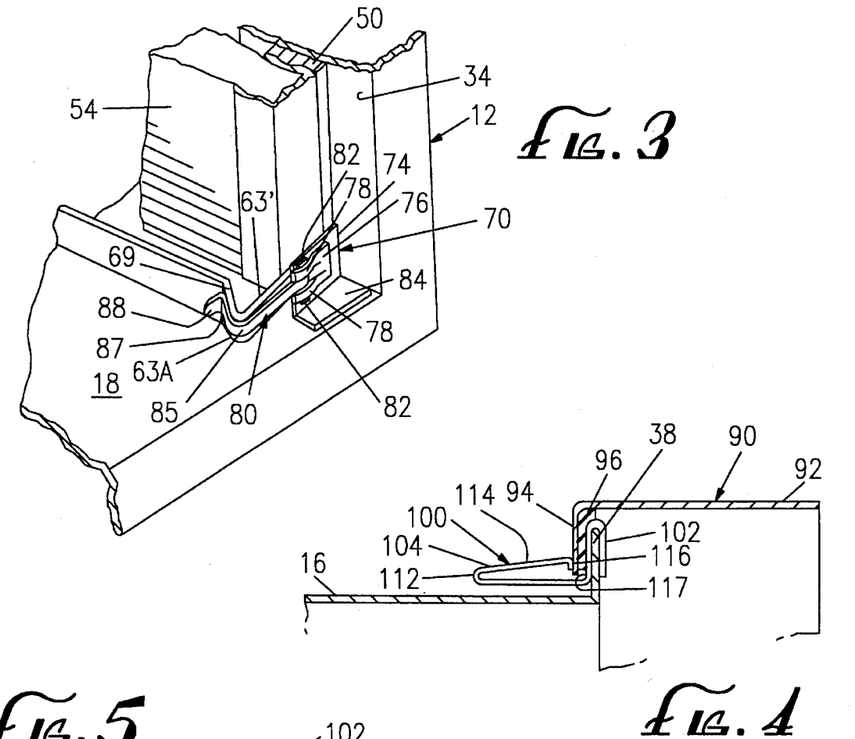
FIG. 3 is a partial perspective view of the present invention showing the use of a panel locking clip to secure a filter panel to the filter frame to complete the compression face seal therebetween.
FIG. 4 is a sectional view taken along the line 4—4 in FIG. 1.

The locking clips 70 in the present invention preferably employ metal snap fasteners manufactured by Ludwig Manufacturing Co., Inc. of Racine, Wis. provided with a right angle mounting bracket 74. As seen in FIGS. 2 and 3, clips 70 each comprise a spring portion 76 secured to the mounting bracket 74, and a flat locking arm 80 pivotally mounted at one end thereof between the bracket and the spring portions of the clip. To provide such pivotal mounting, the spring portion 76 of the clip defines a pair of laterally spaced, flat curvilinear arms 78 extending along and spaced outwardly from the base portion of the clip. Locking arm 80 defines a pair of oppositely projecting flat coplanar tabs 82 disposed between the bracket 74 of the clip and the spaced curvilinear arms 78 of spring portion 76 thereof. Such a clip configuration provides a snap-type pivotal movement of the locking arm 80 with respect to the base and spring portions of the clip.

The mounting brackets 74 on locking clips 70 define a perpendicularly disposed portion 84 by which the clips are welded to the top and bottom walls 16 and 18 of frame 12 at the air inlet end thereof. The clips are positioned on walls 16 and 18 such that the spring portions thereof and the adjacent vertically disposed portions of the mounting brackets project inwardly from the top and bottom frame walls 16 and 18 adjacent the two outer panel retention flanges 34 and the two inner panel retention flanges 36 and 37. So positioned, the base portions 24 of locking clips 70 define forward support surfaces for filter panels 14' and 14".

In the extended locking position illustrated in FIGS. 2 and 3, locking arms 80 of clips 70 project substantially parallel to the base and spring portions 74 and 76 of the clip adjacent the forwardly disposed end wall portions 61' and 63' on the filter panel end caps 56 and 58 and are bent inwardly at 85 so as to extend about and engage a camming surface 61A, 61B, 63A or 63B. Locking arms 80 are also bent outwardly at 87 to define a gripping tabs 88. As the locking arms 80 on clips 70 are pivoted into the extended locking position, the flex in the locking arms allows the end portions thereof to ride over the inwardly projecting curvilinear portions on the adjacent cam surfaces and bear against said portions and the adjacent inclined portion 69 of the cam surfaces. In this position the arm portions of clips 70 pull laterally on the filter panels and hold the panels against the adjacent lateral retention surfaces 39 and 41 of frame 12 to complete the compression seals about the filter panels. A filter panel is removed from the assembly by pivoting a vertically aligned pair of locking clips 70 outwardly to the open position. The flex in the locking arms 80 again allow the arms to ride outwardly along and over the cam surfaces and release the end caps whereupon the panel can be easily slid from the filter frame for replacement.

While pleated paper wet-laid HEPA style filtering media is employed in the filter panels 14 illustrated in the drawings, numerous different types of filtering media and media configurations could be employed in the filter assembly of the present invention for use in a wide variety of filtering applications without having to modify assembly frame 12. As noted earlier herein, different filter medias and media configurations require different media depths and thus different filter panel thicknesses to obtain various air filter characteristics. In the present invention the perimeter face seals about the individual filter panels are formed independently of the depth of the filter media held therein. In the preferred embodiment of air filter assembly 10 of the present invention the spacing between wall portions 61" and 61'" across end cap 56 and between wall portions 63" and 63'" on end cap 58 is about 2.5 inches. This dimension is greater than the thickness of the filter panels (media depth) typically employed in multiple Vee-panel type air filter assemblies regardless of the media configuration or the particular media used. Filter panels in such applications typically vary in thickness from about 0.75 to 2.5 inches. The filter panel walls 60 and 62 and the outer media retention flanges 60' and 62' defined thereby in the panels of the present invention need only be disposed against the end and outer wall portions 61' and 61" and 63' and 63" of the panel end caps and not against the inner wall portions 61'" and 63'" thereof to effect the perimeter face seals about the filter panels. Accordingly, the configuration of panel end caps 56 and 58 will allow for a substantial variance in the depth of the filter media disposed therebetween and accommodate virtually all filter media depths typically employed in multiple Vee-panel type assemblies without having modify either the size of the end caps or the rear end of the filter frame. Regardless of the depth of the media and the particular media employed, it is important that the filter panel frames define flat and rigid outer perimeter side wall portions such as those defined by panel flanges 60' and 62' and end wall portions 61" and 63" to obtain an airtight perimeter face seal between the outer side walls of the filter panel and the lateral panel retention surfaces 39 and 41 of the filter frame 12.

To mount the filter assembly 10 in an installation wherein a plurality of filter assemblies 10 are disposed in adjacent juxtaposition in a master holding frame, a plurality of appropriately sized mounting frames 90 are employed. Mounting frames 90 are secured to the individual filter assemblies as will be described and bolted together and to the sides of the master frame so as to extend thereacross in the desired array. As the mounting frames 90 are each identical in configuration, only one such frame is illustrated in FIG. 1. For the filter assembly 10 illustrated in the drawings which employs two pairs of complementary filter panels, each measuring 12 inches wide by 24 inches high, the mounting frame 90 is square. If one or more additional pairs of complementary filter panels were provided in filter assembly 10, frame 90 would be rectangular and sized accordingly. In a master holding frame for an air duct four feet wide by eight feet high, eight such frames would be secured together and to the master frames to provide the attachment means for the mounting thereon of eight filter assemblies.

Each mounting frame 90 comprises forwardly projecting top, bottom and side walls 92 which are bent inwardly at their rearward ends to define four perpendicularly disposed inwardly directed mounting flanges 94. The front surfaces of flanges 94 are each provided with an elongated compressible sealing gaskets 96 thereon, preferably formed of the same material as gaskets 50, for sealing engagement with the back side of the perimeter mounting flange 38 on the filter assembly frame 12. The filter assembly 10 is removably secured to the mounting frame 90 by means of a plurality of particularly configured locking clips 100 which hold the mounting flanges 94 of frame 90 against mounting flange 38, compressing gaskets 96 therebetween.

Securement clips 100 are preferably formed of flat strips of heat treated and plated spring steel and are bent so as to define a U-shaped gripping portion 102 merging into a perpendicularly disposed U-shaped spring locking portion 104. As seen in FIGS. 1, 4 and 5, the gripping portions 102 of securement clips 100 are disposed about aligned portions of the perimeter flange 38 of assembly frame 12 at the midpoints of the forward ends of the two top walls 16 and bottom walls 18. The gripping portions 102 of the securement clips 100 are sized so as to fit securely about flange 38 and define barbs 106 thereon such that upon the gripping portion 102 being urged into position over a portion of flange 38, the clip is tightly secured to flange 38. So secured, the spring locking portions 104 of clips 100 extend rearwardly adjacent top and bottom walls 16 and 18 and are bent at the rearward ends 112 thereof so as to extend forwardly from 112 at an upward inclination. The inclined portions 114 of clips 112 terminate at their forward ends in a curvilinear frame abutment surface 116.

Upon sliding the filter assembly 10 rearwardly through a mounting frame 90 with the securement clips 100 secured to the upper and lower portions of the assembly frame flange 38 as above-described, inner edge portions of the inwardly projecting flanges 94 on mounting frame 90 abut the inclined portions 114 of clips 100. As the filter assembly is pushed against flanges 94 to compress the sealing gaskets 96 between flanges 94 and the mounting flange 38, the edge portions of flange 94 depress and ride over the inclined portions 114 of the securement clips. As the mounting frame flanges 94 pass over the forward ends of inclined spring portions 114, the pressure on the inclined portions 114 of the clips is relieved and portions 114 snap upwardly whereupon the abutment surfaces 116 at the forward ends of spring portions 114 bear against mounting frame flanges 94, securing the flanges between surfaces 116 and the back side 117 of the clip gripping portions 102 of clips 100 as seen in FIG. 4. Through such a securement, the filter assembly 10 is rigidly but readily releasably secured to the mounting frame 90 which in turn is secured to the master holding frame.

To secure a plurality of the mounting frames 90 together and to the master holding frame, bolt receiving apertures 120 are preferably provided in the forwardly projecting frame walls 92. A plurality of locking tabs 122 are preferably punch formed in walls 92 for the releasable securement of conventional locking wires (not shown) for releasably securing a pre-filter within frame 90 at the air inlet end of filter assembly 10 adjacent frame support 22.

Through the aforesaid construction, not only are the individual filter panels 14' and 14" readily removable from filter assembly 10 for disposal and replacement, the filter assembly 10 can be locked into position without the need for any tools and, if desired, removed from the master frame by simply depressing the inclined spring portions 114 of clips 100 with a screwdriver or similar tool.

Various changes and modifications may be made in carrying out the present invention without departing from the spirit and scope thereof. Insofar as such changes and modifications are within the purview of the appended claims, they are to be considered as part of the present invention.

We claim:

1. An air filter assembly having multiple panels arranged in a plurality of Vees and defining an air inlet end and an air outlet end, said assembly comprising:

a filter support frame;

a plurality of pairs of replaceable filter panels, said panels defining extended end portions and being disposed within said frame so as to define a corresponding plurality of adjacent Vees wherein the apexes of said Vees are disposed adjacent the air outlet end of said filter assembly;

a plurality of panel end caps, one of said end caps being secured to the extended end portion of each of said filter panels and each of said end caps defining a pair of cam surfaces thereon, one of said cam surfaces on each of said end caps being disposed between each of said pairs of filter panels at the apex of the Vee defined thereby for urging portions of said panels proximate said apexes into sealing engagement with said frame, the other of said cam surfaces on each of said end caps being disposed adjacent the air inlet end of said assembly;

locking means carried by said frame adjacent the air inlet end of said assembly for engaging said other cam surfaces on said end caps and releasably holding portions of said panels in sealing engagement with said frame whereby a perimeter face seal about and between each of said panels and said frame is formed and maintained and, upon releasing the engagement of said locking means with said other cam surfaces, said panels can be removed from said frame for disposal and replacement; and wherein all of said end caps are of substantially identical configuration and the cam surfaces defined by each of said end caps are oppositely inclined and symmetrical about a central axis extending transversely through the end cap whereby all of the filter panels are interchangeable throughout said filter assembly to facilitate installation and replacement thereof.

2. The assembly of claim 1 wherein each of said end caps define a filter panel abutment surface and a wall extending about the perimeter of said surface and projecting inwardly therefrom, said wall defining said cam surfaces at spaced locations thereon and cooperating with said filter panel abutment surface to define a trough for receiving an end portion of one of said panels and including an adhesive disposed in said trough securing said end portion within said trough adjacent portions of said wall.

3. The assembly of claim 2 wherein said wall defined by each of said end caps includes end wall portions, an outer wall portion and an inner wall portion, said end wall portions and said outer wall portion being disposed adjacent an end portion of one of said filter panels, said inner wall portion being spaced from said end portion and wherein said cam surfaces defined by wall are disposed adjacent and extend between the extended ends of said inner wall portion and said end wall portions and are inclined from said inner wall portion toward said end wall portions.

4. The assembly of claim 1 wherein said locking means comprises a plurality of locking clips, each of said clips defining a locking arm pivotally mounted thereon between an open position and a locked position, said locking arm engaging one of said other cam surfaces on one of said end caps upon said locking arm being pivoted to the locked position and holding a portion of a filter panel in sealing engagement with said frame.

5. In an air filter assembly including a plurality of replaceable filter panels arranged in angularly disposed pairs within a support frame so as to define a plurality of adjacent Vees with the apexes of the Vees being disposed at the air outlet end of the assembly and the open ends of the Vees being disposed at the air inlet thereof, the improvement comprising:

a plurality of generally rectangular and substantially identically configured panel end caps, a pair of said end caps being secured to extended ends of each of said filter panels and each of said end caps being substantially symmetrical about a central axis extending transversely therethrough and defining a pair of cam surfaces thereon proximate extended ends thereof, one of said cam surfaces on each of said end caps being disposed between each of said pairs of filter panels at the apex of the Vee defined thereby and being inclined toward the other panel in said pair and the other of said cam surfaces on each of said end caps being disposed adjacent the inlet end of said assembly; and locking means carried by the frame adjacent the inlet end of said assembly for engaging each of said other cam surfaces on said end caps and releasably holding portions of said panels in sealing engagement with the frame whereby upon sliding one panel in one of said pairs of panels into the support frame such that one of the cam surfaces on each of the end caps carried by said panel is disposed adjacent the air outlet end of said assembly and subsequently sliding the other of said panels in said pair rearwardly within the frame, one of the cam surfaces on each of the end caps carried by said other panel abuts and passes over one of the cam surfaces on the end caps carried by said one panel, forcing said panels outwardly and compressing portions of the sealing gaskets between said panels and the support frame and, upon engaging said locking means with said other cam surfaces on said end caps carried by said panels, a perimeter face seal about and between each of said panels is formed and maintained and, upon releasing said locking means, said panels can be removed from said frame for disposal and replacement.

6. The improvement of claim 5 wherein each of said end caps define a filter panel abutment surface and a wall extending about the perimeter of said surface and projecting inwardly therefrom, said wall defining said cam surfaces at spaced locations thereon and cooperating with said filter panel abutment surface to define a trough for receiving an end portion of one of said panels and including an adhesive disposed in said trough securing said end portion within said trough adjacent portions of said wall.

7. The assembly of claim 6 wherein said wall defined by each of said end caps includes end wall portions, an outer wall portion and an inner wall portion, said end wall portions and said outer wall portion being disposed adjacent an end portion of one of said filter panels, said inner wall portion being spaced from said end portion and wherein said cam surfaces defined by wall are disposed adjacent and extend between the extended ends of said inner wall portion and said end wall portions and are inclined from said inner wall portion toward said end wall portions.

8. The improvement of claim 5 wherein said locking means comprises a plurality of locking clips, each of said clips defining a locking arm pivotally mounted thereon between an open position and a locked position, said locking arm engaging one of said other cam surfaces on one of said end caps upon said locking arm being pivoted to the locked position and holding a portion of a filter panel in sealing engagement with said frame.

9. In an air filter assembly including a plurality of replaceable filter panels arranged in angularly disposed pairs within a support frame so as to define a plurality of adjacent Vees with the apexes of the Vees being disposed at the air outlet end of the assembly and the open ends of the Vees being disposed at the air inlet end thereof, the improvement comprising:

a plurality of generally rectangular panel end caps, a pair of said end caps being secured to extended end portions of each of said filter panels and each of said end caps defining a pair of cam surfaces thereon proximate extended ends thereof, one of said cam surfaces on each of said end caps being disposed between each of said pairs of filter panels at the apex of the Vee defined thereby for urging portions of said panels proximate said apexes into sealing engagement with the support frame and the other of said cam surfaces of each of said end caps being disposed adjacent the inlet end of said assembly; and a plurality of locking members carried by said frame adjacent the air inlet end of said assembly for engaging said other cam surfaces on said end caps and releasably holding portions of said panels in sealing engagement with said frame whereby a perimeter face seal about and between each of said panels and said frame is formed and maintained and, upon releasing the engagement of said locking members with said other cam surfaces, said panels can be removed from said frame for disposal and replacement.

10. The improvement of claim 9 wherein said panel end caps are substantially identically configured and said cam surfaces defined by each of said end caps are oppositely inclined and symmetrical about a central axis extending transversely through the end cap whereby all of said filter panels are interchangeable throughout said filter assembly to facilitate installation and replacement thereof.

11. The improvement of claim 9 wherein each of said end caps define a filter panel abutment surface and a wall extending about the perimeter of said surface and projecting inwardly therefrom, said wall defining said cam surfaces at spaced locations thereon and cooperating with said filter panel abutment surface to define a trough for receiving an end portion of one of said panels and including an adhesive disposed in said trough for securing said end portion within said trough adjacent portions of said wall.

12. The improvement of claim 9 wherein said locking members comprises a plurality of locking clips, each of said clips defining a locking arm pivotally mounted thereon between an open position and a locked position, said locking arm engaging one of said other cam surfaces on one of said end caps upon said locking arm being pivoted to the locked position and holding a portion of a filter panel in sealing engagement with said frame.

13. The improvement of claim 11 wherein said panel end caps are substantially identically configured and said cam surfaces defined by each of said end caps are oppositely inclined and symmetrical about a central axis extending transversely through the end cap whereby all of said filter panels are interchangeable throughout said filter assembly to facilitate installation and replacement thereof.

14. In an air filter assembly including a plurality of replaceable filter panels arranged in angularly disposed pairs within a support frame so as to define a plurality adjacent Vees with the apexes of Vees being disposed at the air outlet end of the assembly and the open ends of the Vees being disposed at the air inlet end thereof and wherein camming means are carried by each pair of filter panels for urging portions of the panels proximate apexes defined thereby outwardly and into sealing engagement with the support frame, the improvement comprising:

a plurality of generally rectangular and substantially identically configured panel end caps, each of said end caps defining a filter panel abutment surface and a wall extending about the perimeter of said surface substantially normally thereto, a pair of inclined cam surfaces at spaced locations in said wall, extended end portions of each of said filter panels being secured to one of said end caps adjacent the panel abutment surface and portions of said wall defined thereby, said cam surfaces being spaced from said filter panels and projecting inwardly therefrom such that one of said cam surfaces on each of said end caps is disposed between each of said pairs of filter panels adjacent the apex of the Vee defined thereby and is inclined toward the other panel in said pair and the other of said cam surfaces of each of said end caps is disposed adjacent the inlet end of said assembly and;

a plurality of locking members carried by said frame adjacent the air inlet end of said assembly for engaging said other cam surfaces on said end caps and releasably holding portions of said panels in sealing engagement with said frame whereby a perimeter face seal about and between each of said panels and each of said frame is formed and maintained and, upon releasing the engagement of said locking members with said other cam surfaces, said panels can be removed from said frame for disposal and replacement.

15. The improvement of claim 14 wherein the cam surfaces defined by each of said end caps are oppositely inclined and symmetrical about a central axis extending transversely through the end cap whereby all of said filter panels are interchangeable throughout said filter assembly to facilitate installation and replacement thereof.

16. The improvement of claim 14 wherein said walls on said end caps cooperate with the filter media abutment surfaces defined thereby to define troughs for receiving an end portion of one of said filter panels and including an adhesive disposed in each of said troughs for securing therein an end portion of one of said panels.

17. The improvement of claim 14 wherein said locking members comprises a plurality of locking clips, each of said clips defining a locking arm pivotally mounted thereon between an open position and a locked position, said locking arm engaging one of said other cam surfaces on one of said end caps upon said locking arm being pivoted to the locked position and holding a portion of a filter panel in sealing engagement with said frame.

18. The improvement of claim 17 wherein the cam surfaces defined by each of said end caps are oppositely inclined and symmetrical about a central axis extending transversely through the end cap whereby all of said filter panels are interchangeable throughout said filter assembly to facilitate installation and replacement thereof.

19. The improvement of claim 14 including a mounting frame for securing said filter assembly in an air duct and a plurality of clip members for releasably securing said assembly within said mounting frame, said mounting frame comprising an inwardly directed flange extending about said mounting frame adjacent said assembly proximate said air inlet end thereof and said clip members each comprising a U-shaped gripping portion adapted to be slidably disposed about a portion of said assembly for securing said clip member thereto and a generally U-shaped spring portion integrally formed with said gripping portion and extending substantially perpendicularly therefrom and being bent at a distal end thereof, projecting back toward said gripping portion at an upward inclination and terminating in a frame abutment end whereby upon said U-shaped gripping portions of said clips being secured about spaced portions of said support frame and said filter assembly inserted into said mounting frame, said inwardly directed flange on said mounting frame bears against and passes over said projecting inclined portions of said clip members, depressing said projecting portions until said flange clears said frame abutment ends thereof whereupon said projecting portions snap upwardly adjacent portions of said flange on said mounting frame, releasably securing said assembly to said frame.

20. An air filter assembly having multiple panels arranged in a plurality of Vees and defining an air inlet end and an air outlet end, said assembly comprising:

a filter support frame;

a plurality of pairs of replaceable rectangular filter panels, said panels defining extended end portions and being disposed within said frame so as to define a corresponding plurality of adjacent Vees wherein the apexes of said Vees are disposed adjacent the air outlet end of said filter assembly;

a plurality of generally rectangular and substantially identically configured panel end caps, a pair of said end caps being secured to extended end portions of each of said filter panels and each of said end caps defining a pair of cam surfaces thereon proximate extended ends thereof and inwardly spaced from said filter panels, one of said cam surfaces on each of said end caps being disposed between each of said pairs of filter panels at the apex of the Vee defined thereby and abutting a cam surface on the end cap of the other panel in said pair and urging portions of said panels proximate said apexes outwardly into sealing engagement with said frame, the other of said cam surfaces on each of said end cap being disposed adjacent the inlet end of said assembly; and a plurality of pairs of locking clips carried by said frame adjacent the inlet end of said assembly, each of said pairs of clips engaging said other cam surfaces defined by the end caps on one of said filter panels and releasably holding portions of said panel in sealing engagement with said frame whereby a perimeter face seal about and between said panel and said frame is formed and maintained and, upon releasing said engagement of said pair of locking clips with said other cam surfaces, said panel can be removed from said frame for disposal and replacement.

21. The improvement of claim 20 wherein the cam surfaces defined by each of said end caps are oppositely inclined and symmetrical about a central axis extending transversely through the end cap whereby all of said filter panels are interchangeable throughout said filter assembly to facilitate installation and replacement thereof.

22. The assembly of claim 20 wherein each of said locking clips includes a base portion adapted to abut a portion of one of said end caps and an arm portion pivotally movable with respect to said base portion between an open position and a locked position, said arm portion extending about and engaging one on said other cam surfaces and releasably holding a portion of a filter panel in sealing engagement with said frame to form said perimeter face seals.

23. The filter assembly of claim 20 wherein each of said end caps define a filter panel abutment surface and a wall extending about the perimeter of said surface and projecting inwardly therefrom, said wall defining said cam surfaces at spaced locations thereon and cooperating with said filter panel abutment surface to define a trough for receiving an end portion of one of said panels and including an adhesive disposed in said trough for securing said end portion within said trough adjacent portions of said wall.

24. The filter assembly of claim 23 wherein said wall defined by each of said end caps includes end wall portions, an outer wall portion and an inner wall portion, said end wall portions and said outer wall portion being disposed adjacent an end portion of one of said filter panels, said inner wall portion being spaced from said end portion an wherein said cam surfaces defined by wall are disposed adjacent and extend between the extended ends of said inner wall portion and said end wall portions and are inclined from said inner wall portion toward said end wall portions.

25. A replaceable filter panel for use with a plurality of substantially identically configured panels in an air filter assembly having an air inlet and an air outlet end wherein the panels are arranged in angularly disposed pairs within a support frame so as to define a plurality of adjacent Vees with the apexes of the Vees being disposed at the air outlet end of the assembly and wherein the assembly is provided with releasable locking means at the air inlet end thereof for holding portions of the filter panels in sealing engagement with the frame so as to effect perimeter face seals about and between each of the panels and the frame, said panel comprising:

a filter media; panel walls for retaining said filter media therebetween; and a pair of generally rectangular and substantially identically configured panel end caps secured to said panel walls adjacent end portions thereof, each of said end caps defining a pair of oppositely inclined cam surfaces thereon proximate extended ends thereof such that upon disposing said panel in said filter assembly with a plurality of identically configured panels in said angularly disposed pairs, one of said cam surfaces on each of said end caps is disposed between each of the pairs of filter panels at the apex of the Vee defined thereby for urging portions of said panels proximate said apexes into sealing engagement with the frame and the other of said cam surfaces on each of said end caps is disposed adjacent the air inlet end of the assembly for releasable engagement with the locking means thereon whereby said perimeter face seals can be readily formed and maintained.

26. The filter panel of claim 25 wherein said cam surfaces defined by each of said end caps on said panels are symmetrical about a central axis extending transversely through the end cap.

27. The panel of claim 25 wherein each of said end caps define a filter support surface and a wall extending about the perimeter of said surface and projecting inwardly therefrom, said wall defining cam surfaces at spaced locations thereon and cooperating with said filter support surface to define a trough for receiving end portions of said filtering media and said panel walls and including an adhesive disposed in said trough for securing said end portions within said trough adjacent portions of said wall.

28. The improvement of claim 9 including a mounting frame for securing said filter assembly in an air duct and a plurality of clip members for releasably securing said assembly within said mounting frame, said mounting frame comprising an inwardly directed flange extending about said mounting frame adjacent said assembly proximate said air inlet end thereof and said clip members each comprising a U-shaped gripping portion adapted to be slidably disposed about a portion of said assembly for securing said clip member thereto and a generally U-shaped spring portion integrally formed with said gripping portion and extending substantially perpendicularly therefrom and being bent at a distal end thereof, projecting back toward said gripping portion at an upward inclination and terminating in a frame abutment end whereby upon said U-shaped gripping portions of said clips being secured about spaced portions of said support frame and said filter assembly inserted into said mounting frame, said inwardly directed flange on said mounting frame bears against and passes over said projecting inclined portions of said clip members, depressing said projecting portions until said flange clears said frame abutment ends thereof whereupon said projecting portions snap upwardly adjacent portions of said flange on said mounting frame, releasably securing said assembly to said frame.

29. An air filter assembly including a plurality of replaceable filter panels arranged in angularly disposed pairs within a support frame so as to define a plurality of adjacent Vees with the apexes of the Vees being disposed at the air outlet end of the assembly and the open ends of the Vees being disposed at the air inlet end thereof, the improvement comprising:

a plurality of generally rectangular end caps, a pair of said end caps being secured by an adhesive to extended end portions of each of said filter panels and each of said end caps defining a filter panel abutment surface and a wall extending about the perimeter of said surface, said wall cooperating with said surface to define a filter panel receiving trough and wherein said wall projects from said surface at spaced locations thereon so as to define a pair of inwardly directed cam surfaces proximate extended ends of said caps, one of said cam surfaces on each of said end caps being disposed between each of said pairs of filter panels at the apex of the Vee defined thereby for urging portions of said panels proximate said apexes into sealing engagement with the support frame and the other of said cam surfaces of each of said end caps being disposed adjacent the air inlet end of said assembly; and a plurality of locking members carried by said frame adjacent the air inlet end of said assembly for engaging said other cam surfaces on said end caps and releasably holding portions of said panels in sealing engagement with said frame whereby a perimeter face seal about and between each of said panels and each of said frame is formed and maintained and, upon releasing the engagement of said locking members with said other cam surfaces, said panels can be removed from said frame for disposal and replacement.

30. The improvement of claim 29 wherein said extended end portions of said filter panels are disposed adjacent portions of said abutment surfaces and of said perimeter walls of said end caps and wherein said adhesive is retained within said troughs during the securement of said end caps to said end portions of said panels by said perimeter wall.

* * * * *